US009558683B2

(12) United States Patent
Le Devehat et al.

(10) Patent No.: US 9,558,683 B2
(45) Date of Patent: Jan. 31, 2017

(54) IDENTIFICATION TAG ADAPTED TO BE CLIPPED TO A SHAFT

(71) Applicant: PLURITAG INC., Troi-Rivières (CA)

(72) Inventors: Yannick Le Devehat, Quebec (CA); Bernard Lefebvre, Boischatel (CA)

(73) Assignee: PLURITAG INC., Trois-Rivières, QC ( * ) Notice: Subject to any disclaimer, the term of this patent is extended or adjusted under 35 U.S.C. 154(b) by 0 days.

(21) Appl. No.: 14/969,105

(22) Filed: Dec. 15, 2015

(65) Prior Publication Data

US 2016/0180748 A1  Jun. 23, 2016

Related U.S. Application Data

(60) Provisional application No. 62/093,161, filed on Dec. 17, 2014.

(51) Int. Cl.
| G06K 21/06 | (2006.01) |
| G09F 3/06 | (2006.01) |
| G09F 3/00 | (2006.01) |
| A22B 7/00 | (2006.01) |
| G06K 19/077 | (2006.01) |

(52) U.S. Cl.
CPC ............... *G09F 3/06* (2013.01); *A22B 7/007* (2013.01); *G06K 19/07758* (2013.01); *G09F 3/0297* (2013.01)

(58) Field of Classification Search
CPC .......... G09F 3/06; G09F 3/0297; A22B 7/007; G06K 19/07758
USPC ........................................ 235/492, 495, 385
See application file for complete search history.

(56) References Cited

U.S. PATENT DOCUMENTS

| 1,540,320 | A | * | 6/1925 | Everett | G09F 3/16 40/316 |
| 3,977,104 | A | * | 8/1976 | Stupar | H01B 7/368 40/316 |
| 4,268,986 | A | * | 5/1981 | Piana | H01B 7/368 40/316 |
| 4,649,658 | A | * | 3/1987 | Sarton | H01B 7/368 40/316 |
| 4,899,474 | A | * | 2/1990 | Piana | G09F 3/16 40/316 |
| 4,951,596 | A | * | 8/1990 | Wallace, Jr. | G09F 3/16 116/308 |
| 5,027,538 | A | * | 7/1991 | Wilmes | H01B 7/368 24/545 |
| 5,224,745 | A | * | 7/1993 | Howell | B25J 1/04 294/209 |
| 5,236,725 | A | * | 8/1993 | McCormack | G09F 23/00 40/666 |
| 5,628,132 | A | * | 5/1997 | Marshall | B65C 7/00 40/322 |
| 6,231,435 | B1 | * | 5/2001 | Pilger | A22B 5/0064 452/157 |
| 7,194,829 | B2 | * | 3/2007 | Boire | G09F 3/205 40/316 |

(Continued)

*Primary Examiner* — Paultep Savusdiphol
(74) *Attorney, Agent, or Firm* — Norton Rose Fulbright Canada LLP; Alexandre Daoust (57) ABSTRACT

The identification tag is provided in a general horseshoe shape with resilient prongs engageable to a shaft such as a shaft of a pulley-mounted hook at a beginning of a processing line. The identification tag can be used to track a product throughout the processing line.

8 Claims, 5 Drawing Sheets

(56) References Cited

U.S. PATENT DOCUMENTS

| | | | | |
|---|---|---|---|---|
| 8,863,415 B2* | 10/2014 | Muraco | ............... | A61B 7/02 |
| | | | | 24/115 R |
| 8,878,651 B2* | 11/2014 | Kwak | ............... | A22B 5/0064 |
| | | | | 340/10.1 |
| 2006/0048418 A1* | 3/2006 | Boire | ............... | G09F 3/205 |
| | | | | 40/316 |
| 2006/0049949 A1* | 3/2006 | Jurs | ............... | A22B 7/002 |
| | | | | 340/572.8 |
| 2012/0292399 A1* | 11/2012 | Launiainen | ............... | G06K 19/047 |
| | | | | 235/492 |
| 2013/0066235 A1* | 3/2013 | Muraco | ............... | A61B 7/02 |
| | | | | 600/586 |
| 2014/0053462 A1* | 2/2014 | Wei | ............... | A01G 1/001 |
| | | | | 47/58.1 R |
| 2014/0097940 A1* | 4/2014 | Kwak | ............... | A22B 5/0064 |
| | | | | 340/10.1 |

* cited by examiner

IDENTIFICATION TAG ADAPTED TO BE CLIPPED TO A SHAFT

FIELD

The improvements generally relate to the field of identification systems, and more particularly to an identification tag adapted to be snappingly engaged to a rotatable shaft.

BACKGROUND

Although many forms of identification tags existed, there remained unaddressed needs. For instance, many slaughterhouses have a processing line where the carcasses are carried by a pulley-mounted hook across various transformation steps to turn them into animal product, often including harsh environments such as flames used to burn the carcasses' hair, very cold temperature to quickly freeze the animals, agents to clean the hooks, etc. While various forms of identification tags existed for tracking the identity (provenance, etc.) of the live animal, there was a need to continue to track the carcass or meat as it was carried across various transformation steps in the slaughterhouse to ensure that the animal product resulting therefrom is associated with the right animal when they exit the slaughterhouse. Other types of production lines where products are suspended from pulleys had similar needs in terms of tracking the conveyed products. Such similar tracking needs may occur in the pulp and paper industry or metallic component production, for instance.

SUMMARY

Figure 1:
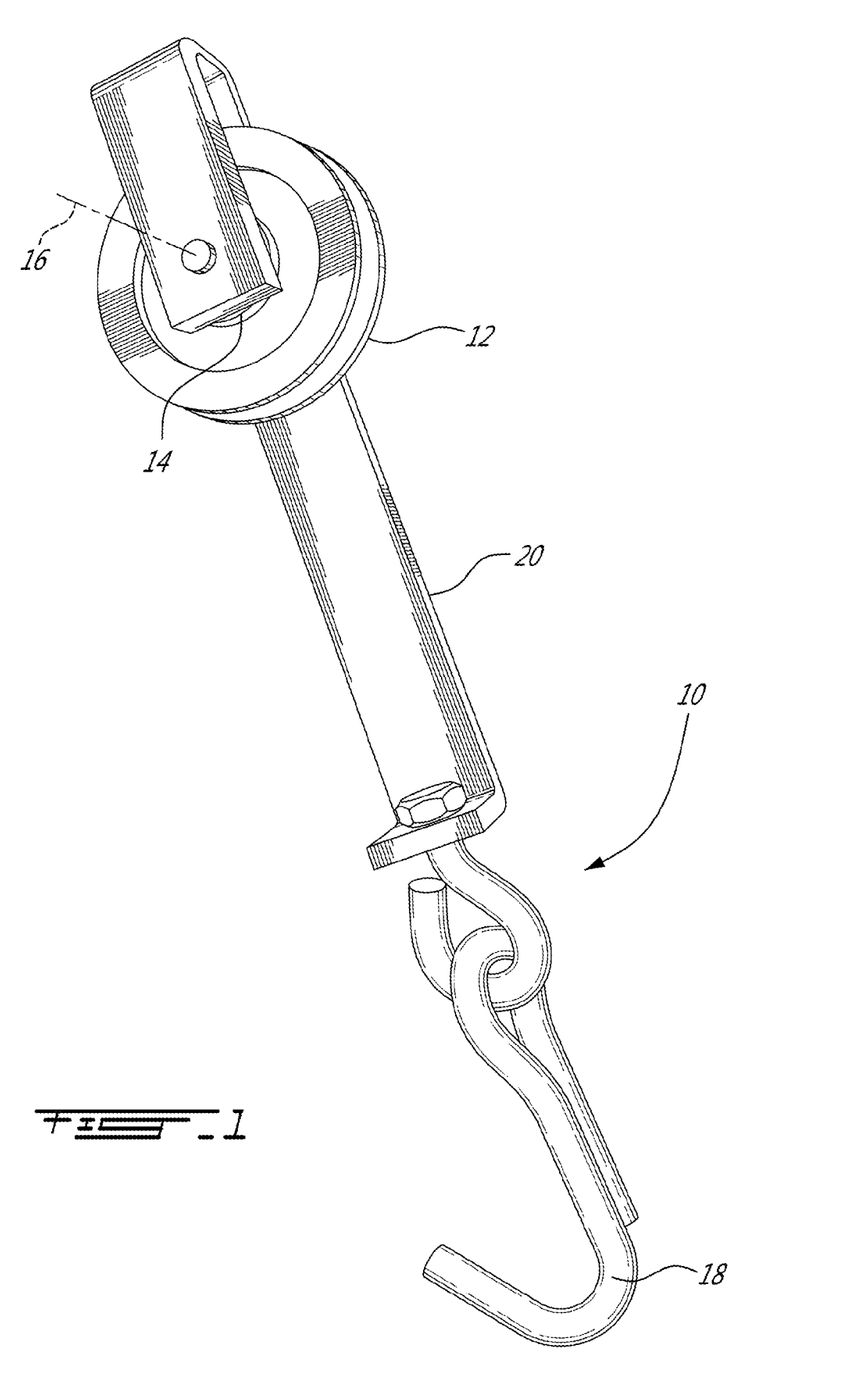
FIG. 1 is a view of an example of a slaughterhouse pulley-mounted hook in accordance with the prior art.

An example of a pulley-mounted hook 10 of a type used in some slaughterhouses is shown in FIG. 1. The pulley-mounted hook 10 generally includes a pulley 12 having a shaft 14 coinciding with a rotation axis 16 of the pulley 12 and a U or J-shaped frame member 20 mounted to the shaft 14 on each side of the pulley 12. A hook 18 is secured to the frame member 20. Alternate embodiments can have different shapes.

In accordance with one aspect, there is provided an identification tag which can be removably clipped onto the shaft 14 in the relatively narrow spacing between the frame member 20 and the pulley 12. To this end, the identification tag is provided with a slender body having a general horseshoe shape with a base and prongs, and which is sufficiently elastic for a neck of the prongs to be spaced-apart from one another upon application of an external force to allow the shaft 14 to be engaged in a shaft area between the prongs, and then recover their original shape to trap the shaft 14 in the shaft area. A substrate having identification data can be embedded within the resilient material and protected thereby. The identification data can be matched to the identification of the given carcass which is attached to the pulley-mounted hook 10. The identification data can be read wirelessly as the pulley proceeds along the carcass processing line. Accordingly, throughout the carcass processing line, the substrate can be read to identify the animal product obtained from a given hook to allow its association to a specific animal identification. At the end of the chain, the shape of the identification tag can be designed to allow for proper cleaning of the hooks without the need for removing the identification tag from the hook. As will be understood by those of ordinary skill in the art in the light of this specification, in alternate embodiments, the identification tag can be adapted for clipping on other shafts than those of slaughterhouse pulley-mounted hooks.

Typically, sometime between the moment when the animal is killed and when the carcass has been engaged on the hook 18, an identification tag of the animal is removed from the animal. Accordingly, at one point in time, typically at the beginning of the processing line, the animal identification from the identification tag is associated with the identification tag which is engaged to the corresponding hook. The carcass is then proceeded along the processing line with the pulley-mounted hook 10 for the various steps to be performed on the carcass to obtain animal product therefrom. The animal product obtained from the carcass is then identified using the reading of the identification tag of the pulley-mounted hook 10.

In accordance with one aspect, there is provided an identification tag clippable to a shaft into a clipped position, the identification tag comprising a body having a slender, horseshoe-like shape with two prongs protruding from a base to corresponding tips, a substrate with computer-readable identification data stored therein, the substrate being embedded within the base, the two prongs having a neck area where the distance between the two prongs is smaller than a diameter of the shaft when in the clipped position, and a broader shaft area located between the two prongs, between the neck area and the base, where the shaft is received when in the clipped position, the body having an elasticity allowing the two prongs to spread apart from one another upon application of an external force to allow the shaft thereacross, into the shaft area, and to spring back toward one another thereafter to trap the shaft in the shaft area.

In accordance with another aspect, there is provided a method of associating an animal product to an animal identification in a slaughterhouse, the method comprising: engaging a carcass to a pulley-mounted hook at a beginning of a processing line of the slaughterhouse, the pulley-mounted hook having an identification tag clipped around a shaft of the pulley-mounted hook, the identification tag having a substrate with identification data stored therein, associating the animal identification of the animal preceding the carcass to the identification data of the identification tag; proceeding the engaged animal carcass and identification tag along a processing line of the slaughterhouse to obtain the animal product therefrom, reading the identification data wirelessly using at least one reader along the processing line to allow identifying the animal product to the animal identification.

In accordance with another aspect, there is provided a system for tracking animal product data in a slaughterhouse, the system comprising: a plurality of identification tags, each being clippable to a shaft of a corresponding pulley-mounted hook into a clipped position, the identification tag comprising a body having a slender, horseshoe-like shape with two prongs protruding from a base to corresponding tips, the two prongs having a neck area where the distance between the two prongs is smaller than a diameter of the shaft when in the clipped position, and a broader shaft area located between the two prongs, between the neck area and the base, where the shaft is received when in the clipped position, the body having an elasticity allowing the two prongs to spread apart from one another upon application of an external force to allow the shaft thereacross, into the shaft area, and to spring back toward one another thereafter to trap the shaft in the shaft area; and a reader securely mountable along a transformation line of the slaughterhouse, the reader being adapted to read identification data stored in the identification tags as the identification tags are carried along the transformation line with corresponding carcasses or animal product by the pulley-mounted hooks.

In accordance with another aspect, there is provided an identification tag clippable to a shaft into a clipped position, the identification tag comprising a body having a slender, horseshoe-like shape with two prongs protruding from a base to corresponding tips, the two prongs having a neck area where the distance between the two prongs is smaller than a diameter of the shaft when in the clipped position, and a broader shaft area located between the two prongs, between the neck area and the base, where the shaft is received when in the clipped position, the body having an elasticity allowing the two prongs to spread apart from one another upon application of an external force to allow the shaft thereacross, into the shaft area, and to spring back toward one another thereafter to trap the shaft in the shaft area.

Many further features and combinations thereof concerning the present improvements will appear to those skilled in the art following a reading of the instant disclosure.

DESCRIPTION OF THE FIGURES

In the figures,

FIG. 2 is an oblique view of an embodiment of an identification tag engageable to a shaft, with FIG. 2A showing a RFID chip and a metal support which are embedded in a plastic body of the identification tag;

FIG. 4A is an oblique view of another embodiment of an identification tag, with FIG. 4B being a cross-section taken along cross-section line 4B-4B and FIG. 4C showing a bare metal support thereof.

DETAILED DESCRIPTION

Figures 2, 2A:
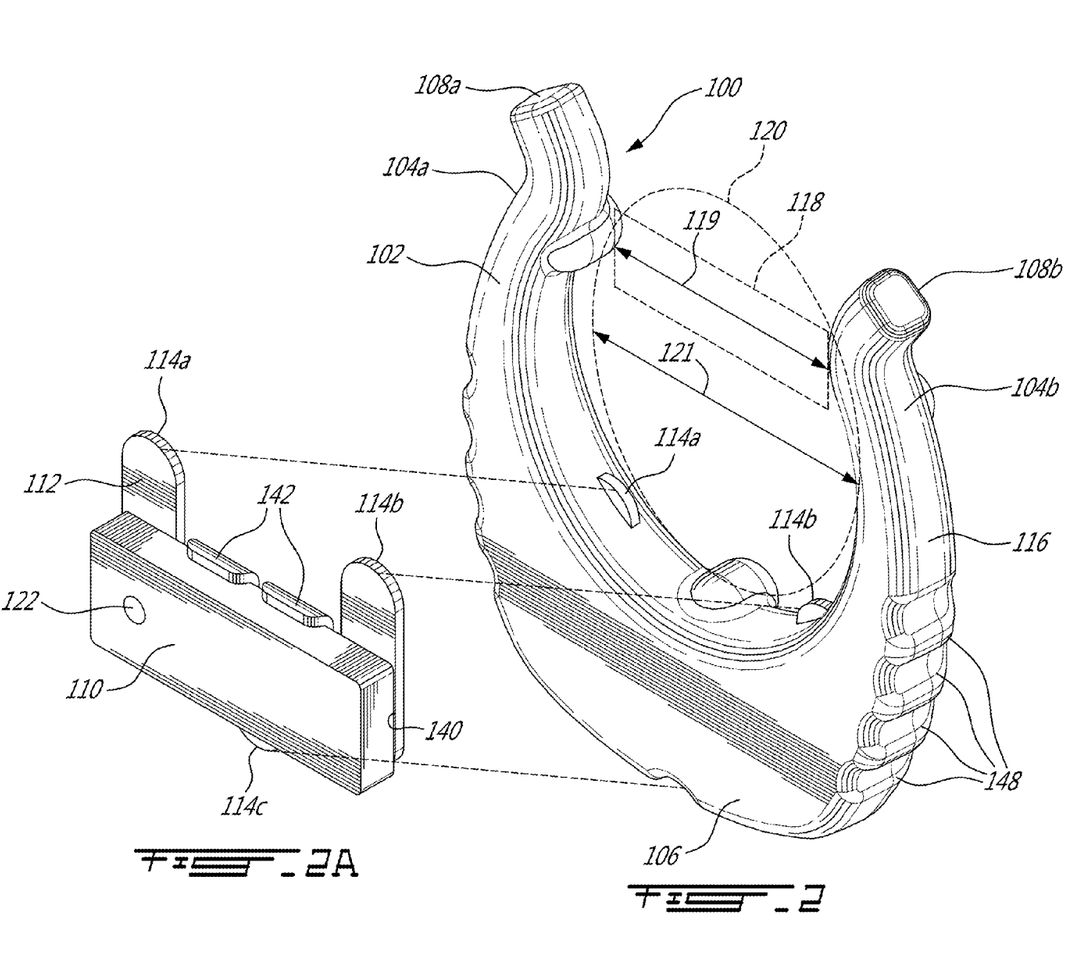

FIG. 2 shows an example of an identification tag 100 which can be inserted between a frame member 20 and a pulley 12 of a hook-mounted pulley 10 such as shown in FIG. 1, and clippingly engaged with the shaft 14.

Figure 3A:
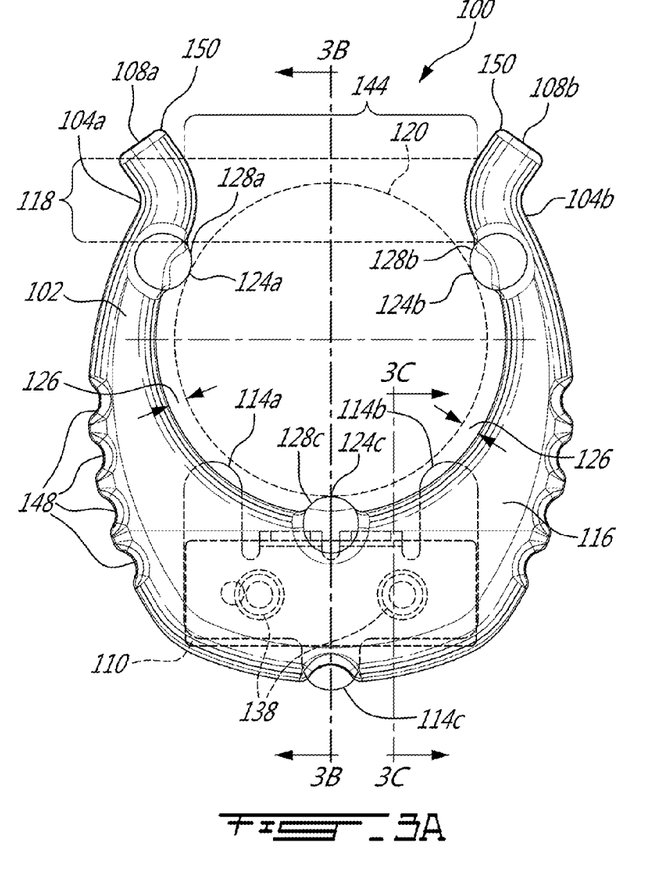
FIG. 3A is an axial elevation view of the identification tag of FIG. 2, with FIGS. 3B and 3C being taken along cross-section lines 3B-3B and 3C-3C, respectively.
Figure 3B:
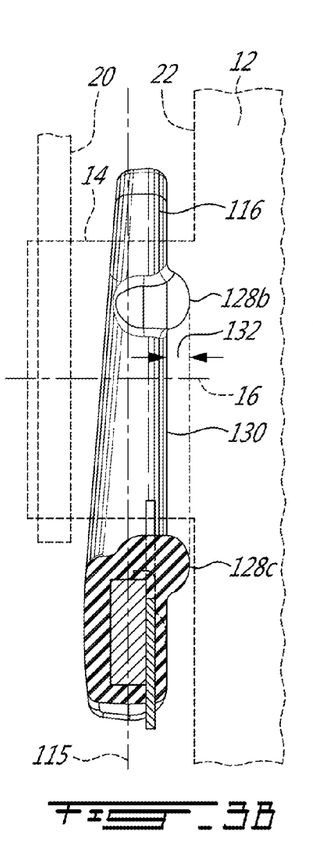

As seen in FIGS. 2 and 2A, the identification tag 100 has a slender body 102 which evokes a horseshoe shape. The body 102 has two prongs 104a and 104b which protrude from a base 106 to corresponding tips 108a and 108b. A substrate 110 having identification data stored therein is embedded into the base 106. In this embodiment, the substrate 110 is provided in the form of a RFID chip and will be referred to as "RFID chip 110" for ease of reading. The RFID chip 110 is supported by a metal support 112. The metal support 112 has three holding tabs 114a, 114b and 114c which in this case protrude in opposite direction in the plane of the horseshoe shape (such as shown at 115 in FIG. 3B) to be held by a mould during moulding. A plastic moulding 116 is cast over the metal support 112 and the RFID chip 110 while the metal support 112 is held in the mould by the three holding tabs 114a, 114b and 114c. The plastic moulding 116 covers and surrounds such as to encapsulate the RFID chip 110. The plastic material is selected so as to resist the flames, freezing temperatures and cleaning agents which can be encountered in a slaughterhouse processing line.

In this embodiment, the prongs 104a and 104b are made of the plastic moulding 116. Accordingly, the plastic material is also selected to exhibit a satisfactory amount of elasticity. This can contribute to protect the substrate 110 from shocks, but most importantly allows a narrower neck area 118 of the prongs 104a and 104b to open up, spreading the prongs 104a and 104b away from one another, to allow engagement of the shaft 14 into a shaft area 120 of the identification tag 100 located between the prongs 104a and 104b and between the narrower neck area 118 and the base 106. Once the shaft 14 has passed the narrower neck area 118, the prongs 104a and 104b can revert back to their original relative position, or 'spring back', for the identification tag 100 to successfully 'clip' onto the shaft 14. As it can be seen in FIG. 1, the narrower neck area 118 has a given distance 119 between the two prongs 104a and 104b that is smaller than a diameter 121 of the shaft 14.

One challenge, which was encountered in designing the identification tag 100 for the specific scenario of a slaughterhouse environment, is to ensure that the tag 100 be successfully read at the relevant moment in the processing line, lest the association between the animal product obtained from the carcass and the animal identification be lost. It was found that several factors could lead to reading errors in this specific context. For instance, it was found that some reading errors could be associated with the fact that the angular orientation of the identification tag 100 was not adequate for proper reading and led to dead spots. Designing the identification tag 100 in a manner that it will become integral with the pulley 12 and rotate therewith as the carcass is carried along the processing line ensures a change in the angular orientation of the identification tag 100 as it moves on the processing line. This change in angular orientation can be harnessed to achieve a greater certainty of a readable orientation as it passes in front of the reader. Accordingly, if a first one of the readings is taken at a moment when the angular orientation of the identification tag 100 is in a dead spot, the second one of the readings can be taken at a different angular orientation where an antenna 122 of the identification tag 100 is better exposed to the reader.

In the illustrated embodiment, the snug engagement of the identification tag 100 with the shaft 14 contributes to ensure the rotation of the identification tag 100 with the pulley 12. In the particular embodiment shown in FIG. 3A, the snug engagement is ensured by the position and configuration of three protrusions 124a, 124b and 124c which protrude from the body 102 in the radially-inward direction (i.e. toward the shaft 14) and are designed to firmly abut against corresponding positions around the shaft 14. The protrusions 124a, 124b and 124c are interspaced from one another along the horseshoe shape in a manner to be regularly interspaced from one another around the periphery of the shaft 14, as shown. These protrusions 124a, 124b and 124c also form a radial spacing 126 between the shaft 14 and the remainder of the body 102 of the identification tag 100 in this embodiment. This radial spacing 126 can contribute to form a distance between the RFID chip 110 and the shaft 14 to facilitate readability, and can also allow the two holding tabs 114a and 114b of the metal support 112 to be received out from interference with the shaft 14. A different number of tabs can be used in an alternate embodiments. It will be noted here that the presence of the radial spacing 126 can also help facilitate cleaning without removing the tag 100 from the shaft 14.

Providing a spacing between the RFID chip 110 and other metallic components (such as the pulley 12 itself which is typically metallic in the case of slaughterhouses) was also considered as a potential factor to better position the identification tag 100 and increase the likelihood of a successful reading. In this embodiment, as perhaps best shown in FIG. 3B, three axial protrusions 128a, 128b and 128c protrude axially from a face 130 of the body 116 to form an axial spacing 132 between the remainder of the body 116 and a face 22 of the pulley 12. In this specific embodiment, the three axial protrusions 128a, 128b and 128c are made integral to corresponding ones of the three radial protrusions 124a, 124b and 124c although it will be understood that in alternate embodiments, the radial protrusions 124a, 124b and 124c can be embodied separately from the axial protrusions 128a, 128b and 128c. An advantage of the support 112 being metallic vs. other types of materials is that in the case of a metal component, if the tag 100 is lost during the processing, it can be detected by metal detectors which are commonly used in slaughterhouses.

Figure 3C:
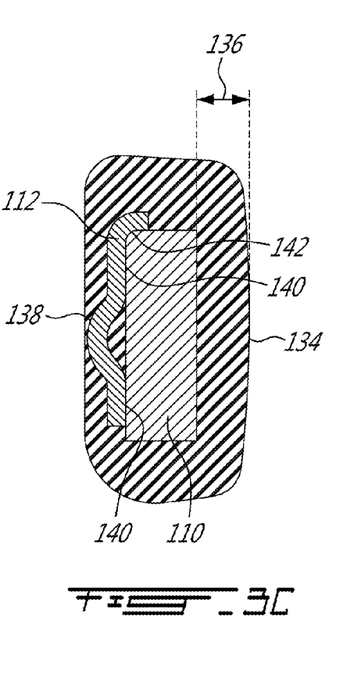

Another source of reading errors can come from damage made to the RFID chip 110, either during use or during moulding. As exposed above, covering the RFID chip 110 with a layer of plastic 134 having a given thickness, as shown in FIG. 3C, can go a certain way in protecting the RFID chip 110 from shocks during use. This can be achieved by locating the metal support 112 of the RFID chip 110 in the mould when moulding, such as can be achieved by the three holding tabs 114a, 114b and 114c which are held by the mould during moulding in this embodiment.

However, issues have been known to possibly occur during manufacture. For instance, when an injection point of the plastic was located directly above the RFID chip 110, the pressure from the injection point during moulding has been known to cause occurrences of damage to the chip 110, and more specifically damage the antenna 122. To alleviate this, in this embodiment, the thickness of the layer of plastic 134 can be further increased on the side of the face of the RFID chip 110 where the plastic is injected, to space the injection point apart from the surface of the chip 110. By using a satisfactory clearance thickness 136, the pressure acting on the RFID chip 110 can be reduced. Furthermore, when the metal support 112 was only held by the holding tabs 114a, 114b and 114c, the pressure acting upon has been diagnosed to bend the metal support 112 to a certain extent, leading to a bending force acting on the RFID chip 110. Although the metal support 112 can bend and revert to its original shape to a certain extent, RFID chips 110 can break when subjected to bending forces. In this embodiment, to alleviate this effect, the metal support 112 is provided with support bulges 138 embossed in the metal support 112 and projecting in the direction opposite the RFID chip 110. The support protrusions 138 act as pillars by coming into abutment with a corresponding face of the mould, supporting a seat area 140 of the metal support 112 which supports the RFID chip 110. The support bulges 138 can be provided in a number, size, and position which impede the bending of the metal support 112, and in turn impede breakage of the RFID chip 110, upon application of the injection pressure. Although the form of support bulges 138 is practical, such supports do not necessarily have to be provided in the form of bulges 138 and can be provided in the form of separate components positioned at the correct positions in the mould, for instance, in alternate embodiments. It will also be noted here that in this specific embodiment, the metal support 112 also has support flanges 142 to help correctly position the RFID chip 110 in the seat area 140.

In this specific embodiment, the identification tag 100 combines a number of additional features. One of these is the presence of a broadening V-shape 144 provided at the tips 108a and 108b of the prongs 104a and 104b, past the narrower neck portion 118. This broadening V-shape 144 helps triggering the action of the shaft 14 pushing the prongs 104a and 104b away from one another as the base 106 is pushed towards the shaft 14 by an external force (the external force can be applied by a hand of a worker for instance). Another one of these is the use of ribs 148 on the lateral edges to provide for a better grip during the action of pushing the base 106 toward the shaft 14 to engage the prongs 104a and 104b. Such features are optional.

One challenge associated specifically with the slaughterhouse environment is the resistance to flame. In early designs, the prongs 104a and 104b had narrower and longer tips 108a and 108b, and the base 106 had squared corners which tended to burn when exposed to the flames. In the illustrated design, sharp edges and narrow portions are avoided and the resulting shape was found to satisfactorily keep the flames used to burn the hair off the carcasses from interfering with the identification tag 100. In this embodiment shown, rounded edges 150 can be provided, for instance, to the prongs 104a and 104b. It is also possible to find satisfactory plastics which resist to cleaning agents which are typically used to disinfect the pulley-mounted hooks 10 between uses with different carcasses, allowing the identification tags 100 to be used multiple times.

Figure 4A:
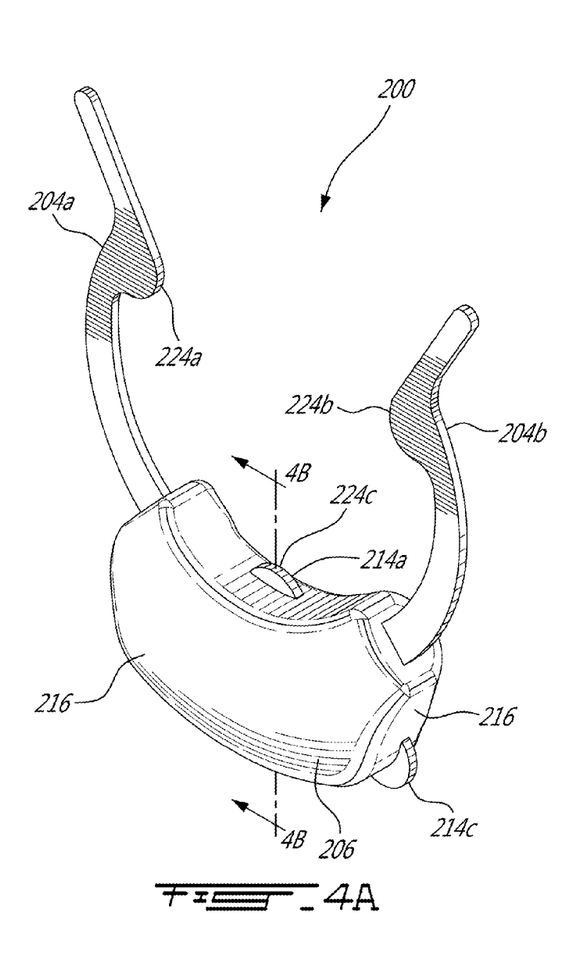
Figure 4B:
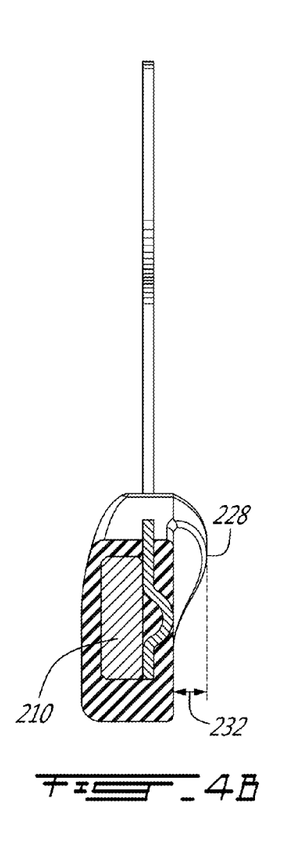
Figure 4C:
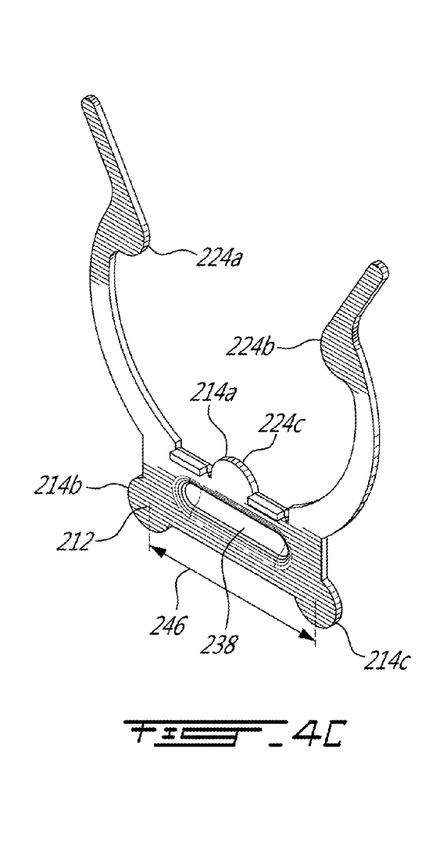
Figure 5:
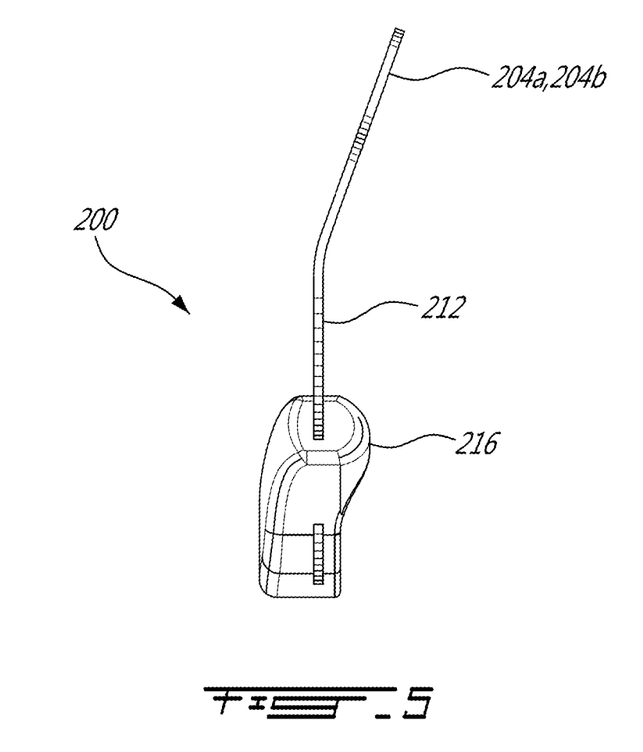
FIG. 5 is a sectional side view of another example of an identification tag engageable to a shaft, in accordance with an embodiment.

Another embodiment of an identification tag 200 will now be presented with reference to FIGS. 4A, 4B and 4C. For ease of reading, elements of the identification tag 200 that are like elements of the identification tag 100 will bear like reference numbers but in the 200-series. As will be understood, in this embodiment, the prongs 204a and 204b are provided in the form of extensions of the metal support 212 rather than as extensions of the plastic moulding 216. Indeed, in an embodiment such as presented with reference to earlier figures, it was found that the plastic material of the prongs 104a and 104b and radial protrusions 124a, 124b and 124c could wear with time, leading to a less secure clipping action where the identification tag 100 could fail to satisfactorily rotate with the shaft 14 after a given amount of wear. It was found that with prongs 204a and 204b and radial protrusions 224a, 224b and 224c made of metal, such as shown in FIG. 4A, such a wearing effect could be avoided or significantly impeded. Another difference between the embodiment shown in FIGS. 4A, 4B and 4C and earlier figures is the fact that a single support bulge 238 is provided in the form of an obround shape. This support bulge 238 was found satisfactory in resisting the bending effect. It will be noted here that the radial protrusion 224c of the base 206 is one of three holdings tabs 214a, 214b and 214c which are used to secure the metal support 212 in the mould during moulding of the plastic moulding 216 in this embodiment. As shown, the two protrusions 214a and 214c protrude in a radially-outward direction from the plastic moulding 216 at the base 206 and are spaced apart from one another by a spacing distance 246. An axial protrusion 228 is provided in the shape of the plastic moulding 216, to maintain a spacing 232 between the RFID chip 210 and the U or J-shaped frame member 20 of the pulley-mounted hook 10. In an alternate embodiment, such as shown in FIG. 5, the prongs 204a and 204b can be bent at mid distance from the base to allow the identification tag 200 to be securely received in the pulley-mounted hook 100.

Another potential advantage of the configuration shown in FIGS. 4A, 4B and 4C is the fact that a single mould can be used to make identification tags 200 for different diameters of pulleys 12. Indeed, various metal support shapes can be provided, such as two or more support shapes having various prong sizes but the same base and seat shape, such that any one of the sizes can be received in a single mould independently of the length of the prongs which protrudes from the mould.

As can be understood, the examples described above and illustrated are intended to be exemplary only. For instance, various forms of RF technology can be used in the tag, such as low frequency (LF), high frequency (HF) and ultra-high frequency (UHF) for instance. Moreover, in alternate embodiments, the identification data can be stored in a substrate other than a RFID chip. Examples of potential alternate substrates could be optically readable substrates or substrates which otherwise react to other frequencies. The substrate can be passive or active. For instance, the substrate can be provided in the form of a computer-readable memory and the identification tag can further house a processor to read the computer readable memory, a power source and an emitter to emit a signal containing the computer-readable memory, for instance. Moreover, in alternate embodiments, the tag can be designed to stay fixed at a given angle rather than rotating with the pulley, as this can be satisfactory in some embodiments. Accordingly, the scope is indicated by the appended claims.

What is claimed is:

1. An identification tag clippable to a shaft into a clipped position, the identification tag comprising a body having a slender, horseshoe-like shape with two prongs protruding from a base to corresponding tips, a substrate with computer-readable identification data stored therein, the substrate being embedded within the base, the two prongs having a neck area where the distance between the two prongs is smaller than a diameter of the shaft when in the clipped position, and a broader shaft area located between the two prongs, between the neck area and the base, where the shaft is received when in the clipped position, the body having an elasticity allowing the two prongs to spread apart from one another upon application of an external force to allow the shaft thereacross, into the shaft area, and to spring back toward one another thereafter to trap the shaft in the shaft area; wherein the substrate is provided as part of a RFID chip, the body further having a metal support having a seat area receiving the RFID chip in the base, and a plastic moulding encapsulating the RFID chip and in which the RFID chip and the seat area are embedded; wherein the prongs are provided in the form of extensions of the metal support which protrude from the plastic moulding; and wherein the metal support has a protrusion on each prong, at the neck area, and a protrusion protruding from the plastic moulding at the base, the protrusions being interspaced from one another along the horse-shoe like shape and protruding in a radially-inward direction from a remainder of the body to form a snug abutting engagement with the shaft for the identification to rotate with the shaft during use, while leaving a radial spacing between the remainder of the body and the shaft when in the clipped position.

2. The identification tag of claim 1 wherein the plastic moulding has a bulge protruding axially from the seat area in a direction opposite from the position of the RFID chip.

3. The identification tag of claim 1 wherein the metal support further has two radially-outward protrusions protruding in a radially-outward direction from the plastic moulding at the base and being spaced apart from one another by a spacing distance, the metal support further comprising at least one structural support provided in the form of an axial protrusion in the seat area being oriented in a direction opposite from the position of the RFID chip.

4. The identification tag of claim 1 wherein the body has at least one axial protrusion protruding axially from the base to maintain an axial spacing between the embedded substrate and a pulley rotating with the shaft when in the clipped position.

5. The identification tag of claim 1 wherein the metal support has at least one support protrusion protruding normal from the seat area, opposite the RFID chip, the support protrusion being surrounded by a plastic moulding and reaching a face of the plastic moulding.

6. The identification tag of claim 1 wherein the plastic moulding has a given thickness covering the RFID chip.

7. The identification tag of claim 1 wherein the prongs form a broadening V-shape at the tips, past the neck area.

8. The identification tag of claim 1 wherein the plastic moulding is entirely made of a plastic material resistant to flames, freezing and slaughterhouse processing line equipment cleaning agents, and does not have any sharp edges.

* * * * *